(12) United States Patent
Huether et al.

(10) Patent No.: US 7,938,083 B1
(45) Date of Patent: May 10, 2011

(54) PET CADDY

(76) Inventors: Connie Huether, Fargo, ND (US); Ross Enriquez, Elk Grove, CA (US)

(*) Notice: Subject to any disclaimer, the term of this patent is extended or adjusted under 35 U.S.C. 154(b) by 483 days.

(21) Appl. No.: 12/029,494

(22) Filed: Feb. 12, 2008

Related U.S. Application Data

(63) Continuation-in-part of application No. 11/503,568, filed on Aug. 12, 2006, now abandoned.

(51) Int. Cl.
 *A01K 1/10* (2006.01)
 *A01K 5/00* (2006.01)
 *A01K 5/01* (2006.01)
 *A01K 39/00* (2006.01)
(52) U.S. Cl. .................................................... 119/61.5
(58) Field of Classification Search ............... 119/61.5, 119/61.56, 61.57, 484
 See application file for complete search history.

(56) References Cited

U.S. PATENT DOCUMENTS

| | | | | |
|---|---|---|---|---|
| 2,542,162 | A * | 2/1951 | Sutton | 312/236 |
| 4,065,195 | A * | 12/1977 | Fahmie | 312/258 |
| 6,435,633 | B2 * | 8/2002 | Hoshi | 312/242 |
| 2006/0032451 | A1 * | 2/2006 | Gonet | 119/61.5 |
| 2009/0241844 | A1 * | 10/2009 | Becattini et al. | 119/51.5 |
| 2010/0101498 | A1 * | 4/2010 | Lush | 119/52.1 |

* cited by examiner

*Primary Examiner* — Timothy D Collins
*Assistant Examiner* — Valentina Xavier

(57) ABSTRACT

A pet feeding system and storage compartment in which to store and transport various pet supplies (e.g. food, etc.). The pet feeding system and storage compartment generally includes a base unit including a compartment, wherein the compartment extends within the base unit, a cover unit movably attached to the base unit, wherein the cover unit includes an open position and a closed position with respect to the compartment of the base unit and at least one container secured to the cover unit. The compartment is sealed in the closed position and may be accessed in the open position. The container is separate from the compartment so as to prevent access to the compartment from the container.

9 Claims, 7 Drawing Sheets

PET CADDY

CROSS REFERENCE TO RELATED APPLICATIONS

I hereby claim benefit under Title 35, United States Code, Section 120 of U.S. patent application Ser. No. 11/503,568 filed Aug. 12, 2006 now abandoned. This application is a continuation in-part of the application Ser. No. 11/503,568. The application Ser. No. 11/503,568 is hereby incorporated by reference into this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to pet feeders and more specifically it relates to a pet feeding system and storage compartment for efficiently providing a feeder in which to store and transport various pet supplies (e.g. food, etc.).

2. Description of the Related Art

Any discussion of the prior art throughout the specification should in no way be considered as an admission that such prior art is widely known or forms part of common general knowledge in the field.

Pet feeders have been in use for years. Typically, pet feeders are manufactured in various sizes, shapes and colors. Pet feeders are generally comprised of a bowl, container or dish, wherein the container is filled with pet food when it is desired to feed the pet (e.g. cat, dog, etc.). The owners of the pet must also generally have a separate container to store the various pet supplies, such as but not limited to pet food, scooping devices to transfer the food from the container to the container, pet toys and various other supplies.

This can be troublesome for many pet owners in that the pet owners may not have room to store the various types of containers and containers needed. This can also be bothersome in that when traveling it may be difficult to remember to bring the various separate items (i.e. container, pet food, etc.). Because of the general lack of efficiency and practicality in the prior art there is the need for a new and improved pet feeding system and storage compartment for efficiently providing a feeder in which to store and transport various pet supplies (e.g. food, etc.).

BRIEF SUMMARY OF THE INVENTION

The general purpose of the present invention is to provide a pet feeding system and storage compartment that has many of the advantages of the pet feeders mentioned heretofore. The invention generally relates to a pet feeder which includes a base unit including a compartment, wherein the compartment extends within the base unit, a cover unit movably attached to the base unit, wherein the cover unit includes an open position and a closed position with respect to the compartment of the base unit and at least one container secured to the cover unit. The compartment is sealed in the closed position and may be accessed in the open position. The container is separate from the compartment so as to prevent access to the compartment from the container.

There has thus been outlined, rather broadly, some of the features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction or to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

An object is to provide a pet feeding system and storage compartment in which to store and transport various pet supplies (e.g. food, etc.).

Another object is to provide a pet feeding system and storage compartment that stores various pet supplies within or about a single compartment.

An additional object is to provide a pet feeding system and storage compartment that may be utilized inside or outside of the home and is further durable enough to withstand various weather elements.

A further object is to provide a pet feeding system and storage compartment that may be utilized when traveling, such as when vacationing or camping.

Another object is to provide a pet feeding system and storage compartment that may be utilized to store various amounts of pet food (e.g. 10 pounds, 20 pounds, etc.).

Another object is to provide a pet feeding system and storage compartment that includes an airtight compartment to store the pet food within to prevent the pet food from spoiling within the compartment or from outside elements (e.g. rain, etc.) seeping within the compartment.

Another object is to provide a pet feeding system and storage compartment that secures various food and water containers to allow the pets to feed.

Another object is to provide a pet feeding system and storage compartment that includes various storage pouches to store various pet supplies (e.g. pet leash, pet brush, pet treats, etc.).

Another object is to provide a pet feeding system and storage compartment that includes various handles and rollers to allow for convenient transport.

Another object is to provide a pet feeding system and storage compartment that is easily cleaned.

Other objects and advantages of the present invention will become obvious to the reader and it is intended that these objects and advantages are within the scope of the present invention. To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

A. Overview

Figure 1:
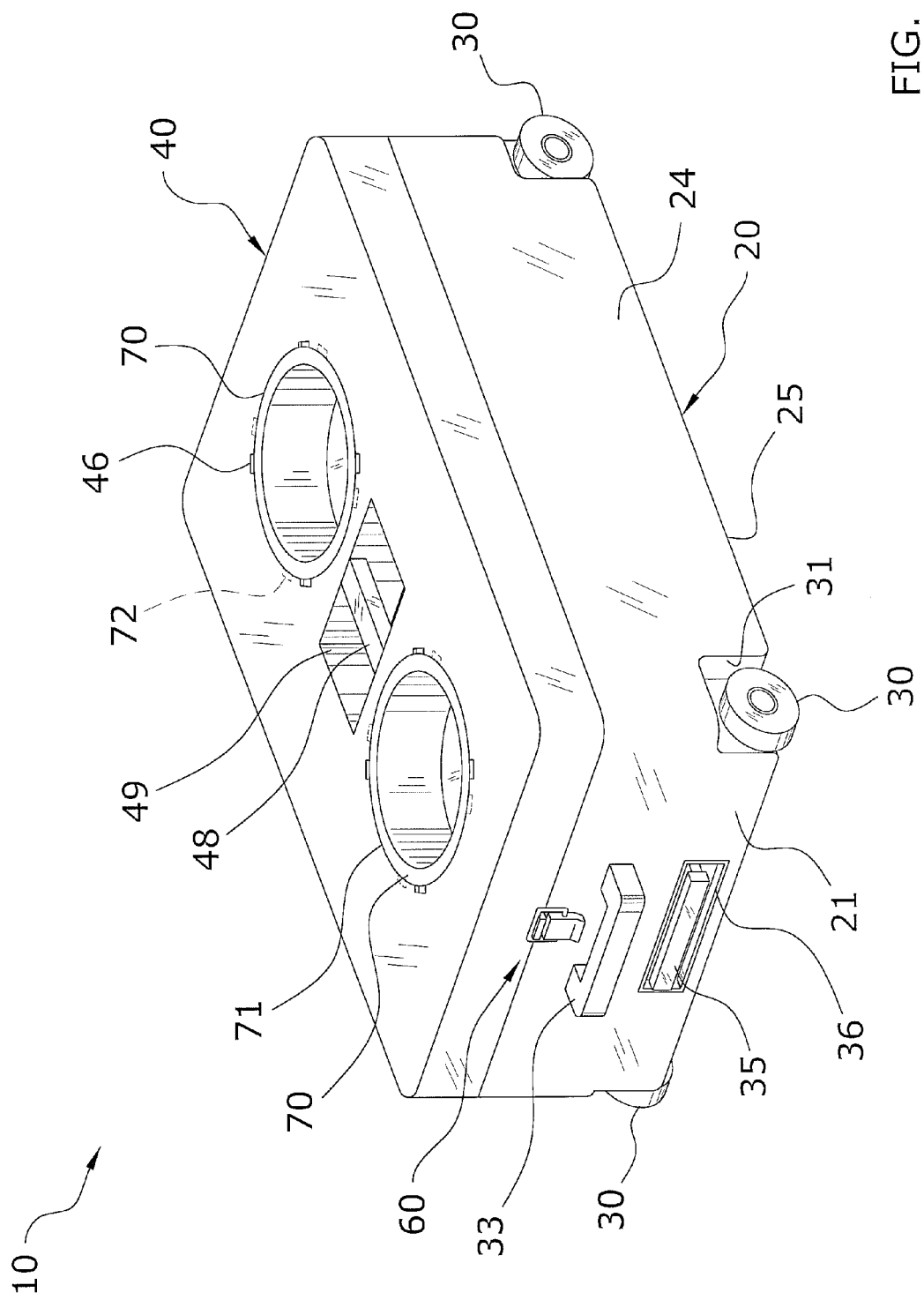
FIG. 1 is an upper perspective view of the present invention in a closed position.
Figure 2:
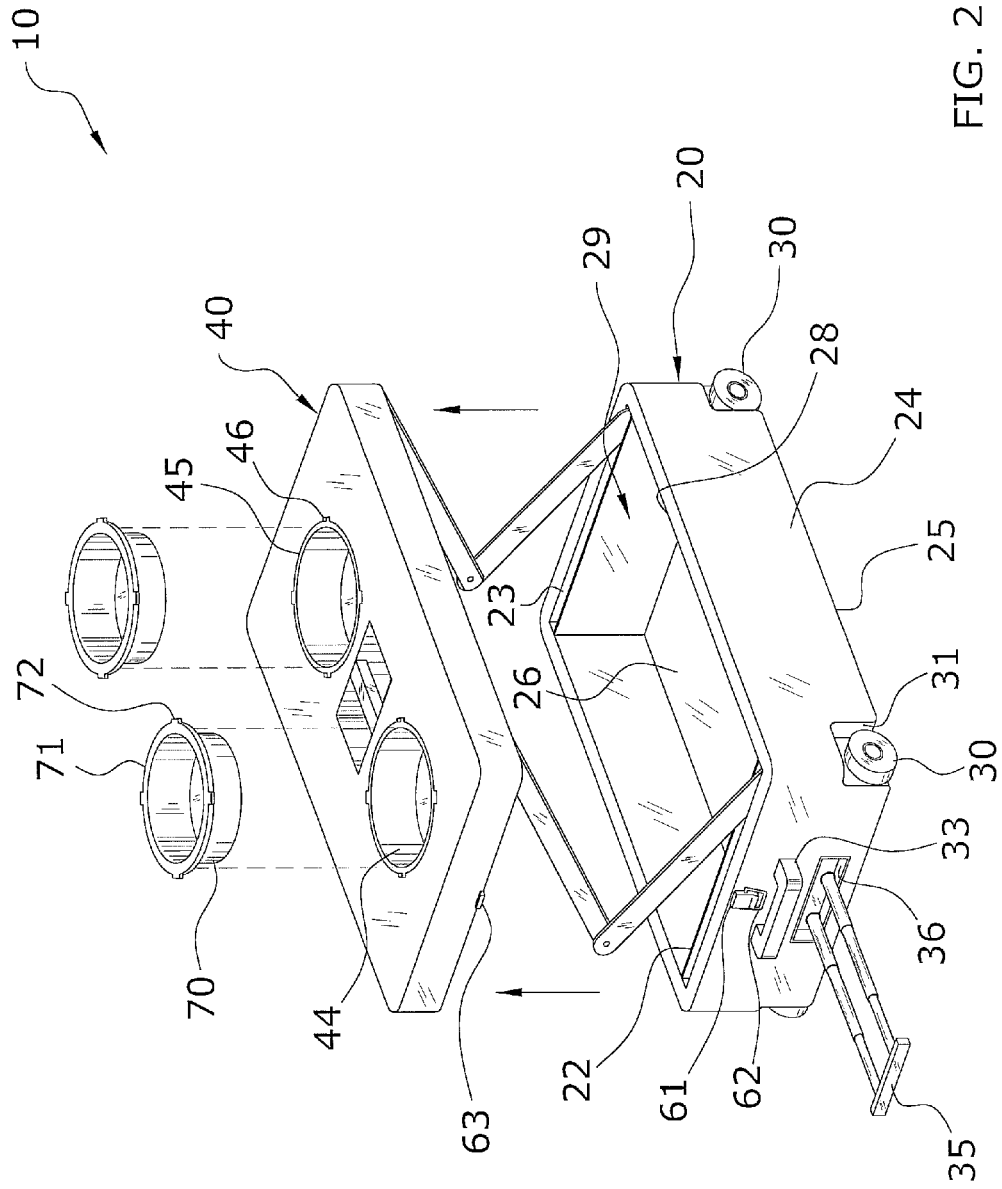
FIG. 2 is an exploded upper perspective view of the present invention in an open position.
Figure 3:
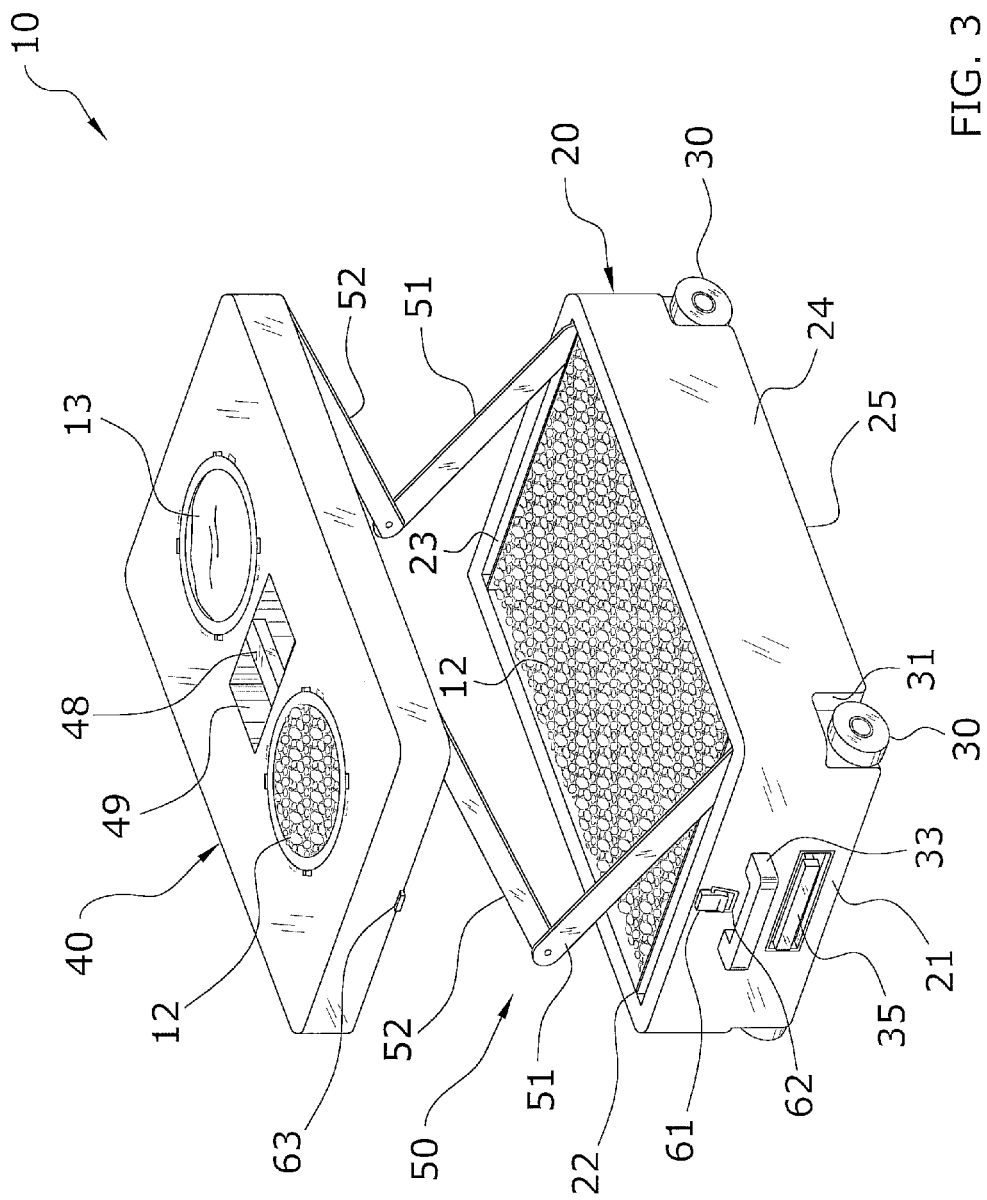
FIG. 3 is an upper perspective view of the present invention in an open position with pet food stored within the compartment.
Figure 4:
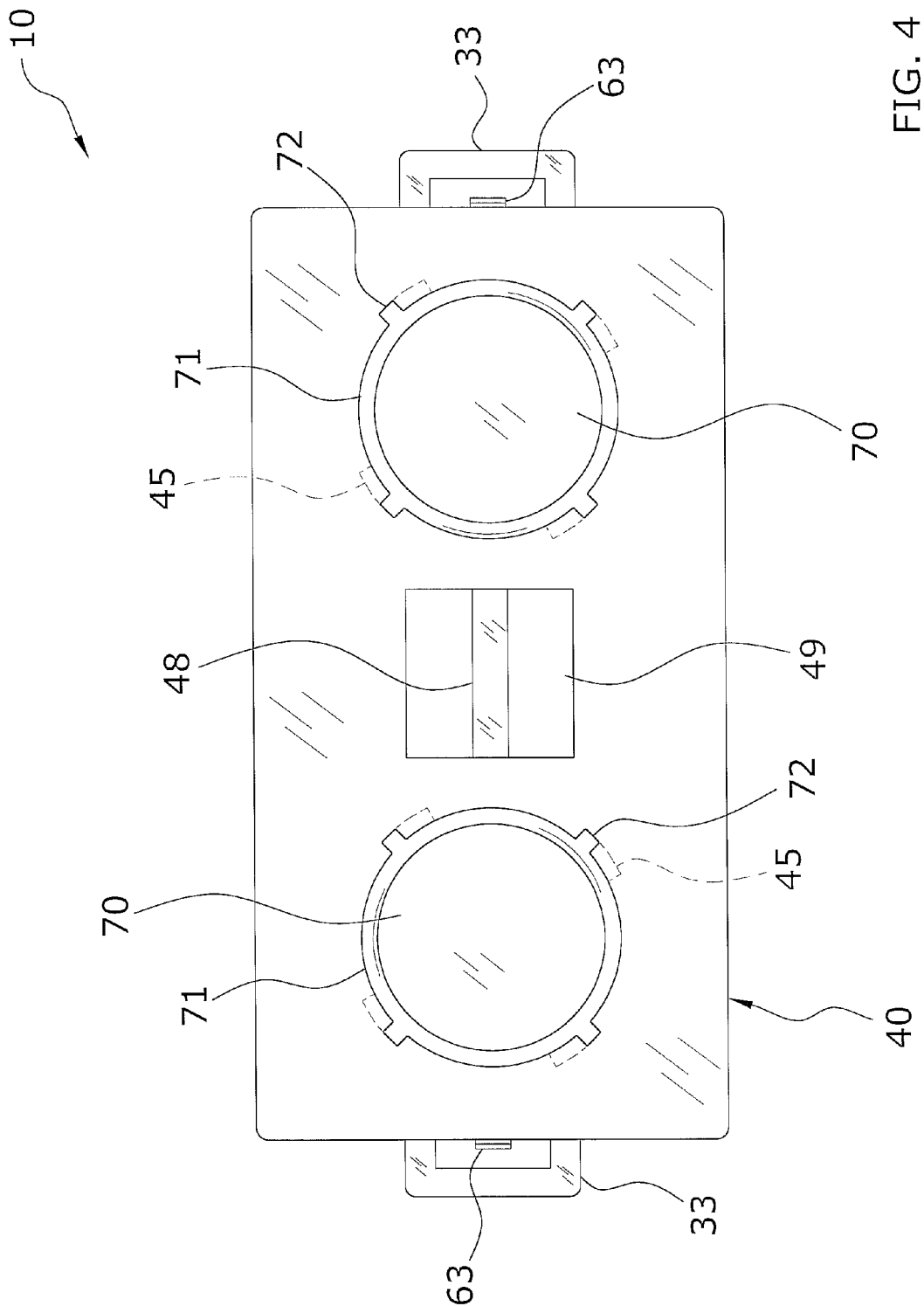
FIG. 4 is a top view of the present invention illustrating the securing portions of the container positioned and aligned within the slots.
Figure 5:
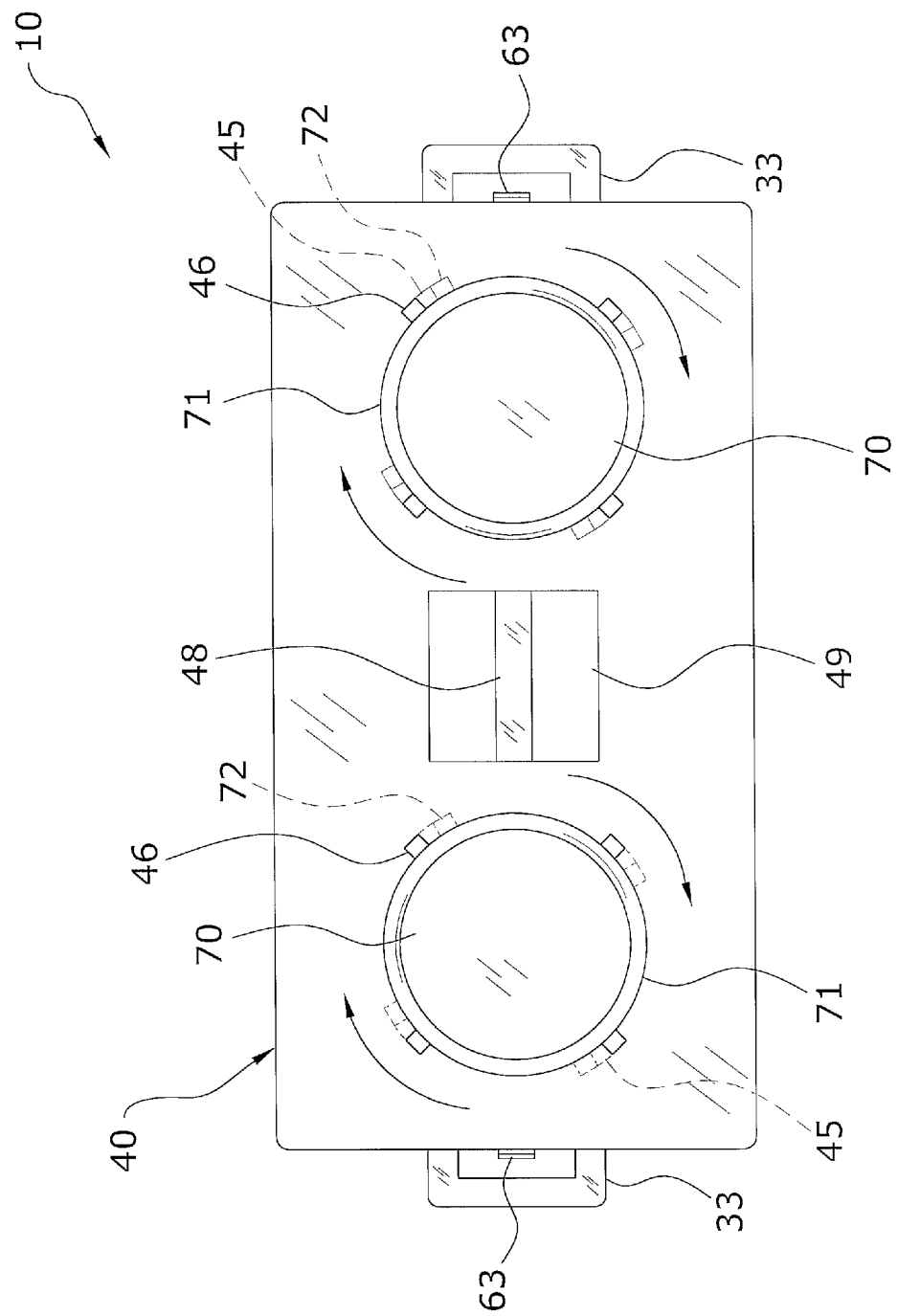
FIG. 5 is a top view of the present invention illustrating the securing portions of the container rotated within the channel and not aligned with the slots thus securing the container within the upper opening of the cover unit in a twist lock manner.
Figure 6:
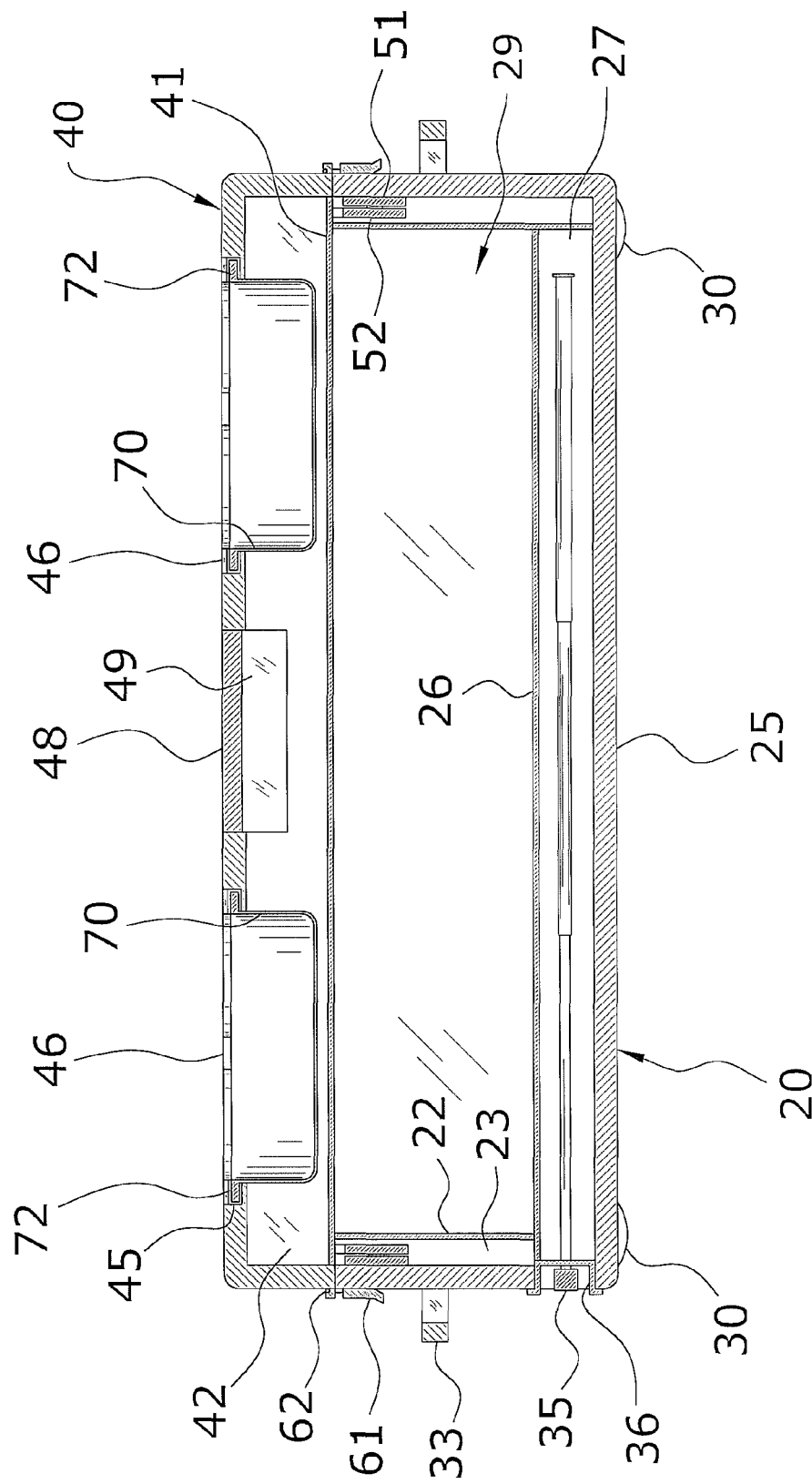
FIG. 6 is a side cross-sectional view of the present invention.
Figure 7:
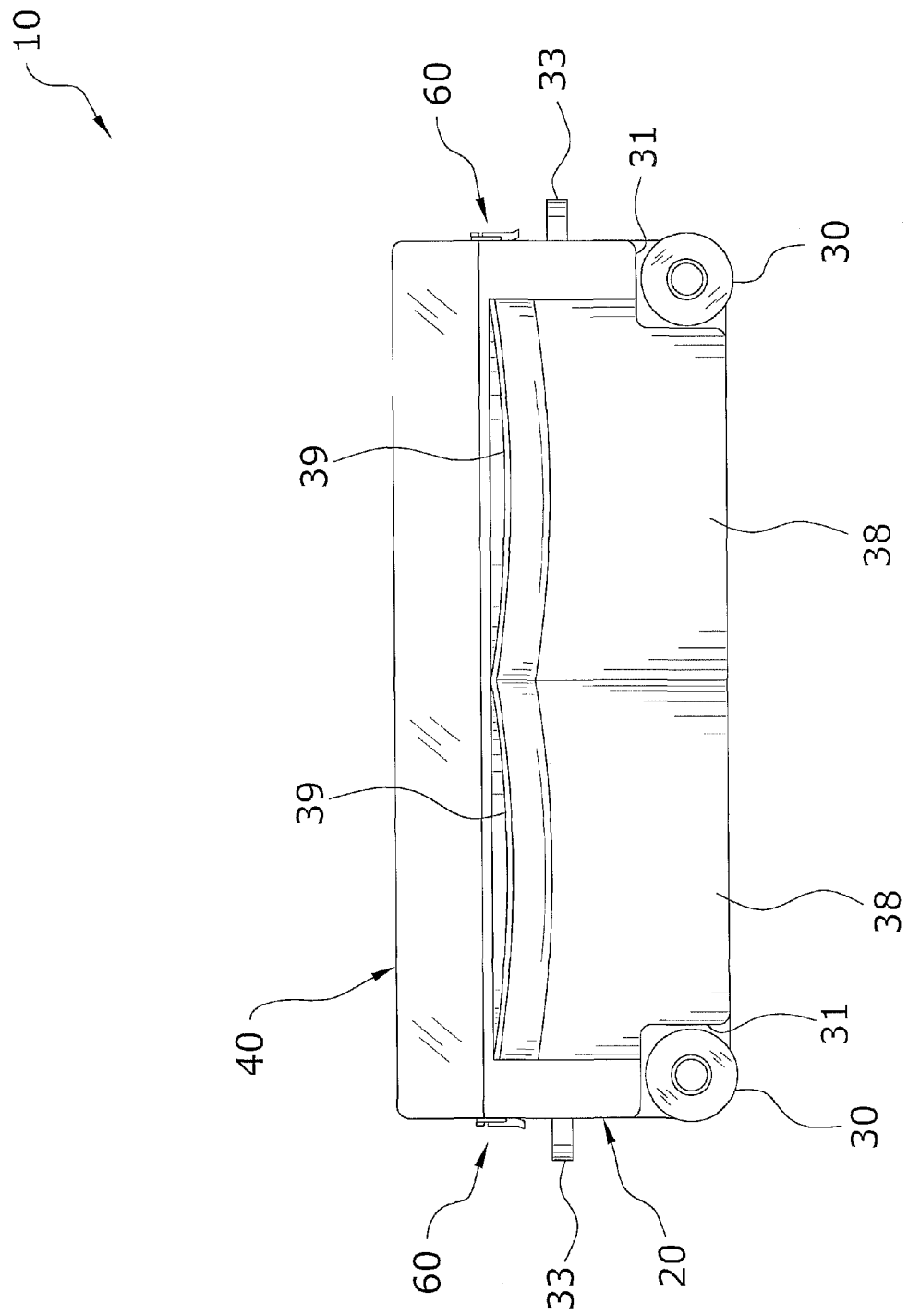
FIG. 7 is a rear side view of the present invention illustrating the pouches.

Turning now descriptively to the drawings, in which similar reference characters denote similar elements throughout the several views, FIGS. 1 through 7 illustrate a pet feeding system and storage compartment 10, which comprises a base unit 20 including a compartment 29, wherein the compartment 29 extends within the base unit 20, a cover unit 40 movably attached to the base unit 20, wherein the cover unit 40 includes an open position and a closed position with respect to the compartment 29 of the base unit 20 and at least one container 70 secured to the cover unit 40. The compartment 29 is sealed in the closed position may be accessed in the open position. The container 70 is separate from the compartment 29 so as to prevent access to the compartment 29 from the container 70.

B. Base Unit

The present invention includes the base unit 20 and the cover unit 40. The storage compartment 29 is formed within the base unit 20 and sealed via the cover unit 40 closing over the base unit 20. The closed base unit 20 and cover unit 40 may be comprised of various sizes to hold various amounts of pet food 12 (e.g. 20 pounds of pet food 12, etc.) within the compartment 29 and other supplies. The base unit 20 may also be comprised of various materials, such as but not limited to plastic, to withstand various harsh weather elements and also to be easily cleaned and maintained. The base unit 20 is preferably comprised of a rectangular shaped configuration; however it is appreciated that the base unit 20 may be comprised of various shapes rather than the preferred embodiment.

The base unit 20 includes a pair of end walls 21, a pair of sidewalls 24 and a floor 25. An opening 28 also preferably extends within an upper end of the base unit 20 between the pair of end walls 21, a pair of sidewalls 24 and a floor 25, wherein the opening 28 interconnects with a compartment 29. The compartment 29 is preferably comprised of a rectangular shaped configuration; however it is appreciated that the base unit 20 may be comprised of various shapes rather than the preferred embodiment. The pet food 12 is preferably stored within the compartment 29. A plurality of fasteners (e.g. screws) may also be utilized to attach the cover unit 40 to the base unit 20, wherein the fasteners would fold down when the present invention is in the closed position and secure the cover unit 40 to the base unit 20.

A pair of end panels 22 are positioned within the base unit 20, wherein the end panels 22 are parallel with the end walls 21 and preferably positioned close to a respective end wall 21. Each of the end panels 22 and the respective end wall 21 defines an end cavity 23. The end cavity 23 is preferably comprised of a width great enough to receive and substantially encompass a respective hinge 50.

A floor panel 26 is also preferably positioned within the base unit 20, wherein the floor panel 26 is parallel with the floor 25 and preferably positioned close to the floor 25. The floor 25 and the floor panel 26 define a floor cavity 27. The floor cavity 27 is preferably comprised of a width great enough to receive and substantially encompass the adjustable handle 35, wherein the handle 35 extends within and out of the floor cavity 27. The floor panel 26, the end panels 22 and the sidewalls 24 preferably define the compartment 29 of the base unit 20. Any cracks or seams between adjacent floor panel 26, end panels 22, or sidewalls 24 are preferably sealed in a watertight manner so as to prevent any pet food 12 from escaping the compartment 29 to within the cavities 23, 27 and prevent dust or debris from entering within the compartment 29 from the cavities 23, 27.

The base unit 20 also preferably includes a plurality of rollers 30 rotatably attached to the base unit 20. The rollers 30 are preferably positioned upon the four lower corners of the base unit 20. The rollers 30 allow the individual to easily move the present invention via rolling the base unit 20. The rollers 30 are preferably each positioned within a notched portion 31 extending within the intersection of the sidewall 24, the end wall 21 and the floor 25. The rollers 30 preferably extend within the notched portion 31 a sufficient distance so the outer surface of the rollers 30 is substantially flush with the sidewall 24 and the end wall 21. The lower surface of the rollers 30 also preferably does not extend a sufficient distance past the lower surface of the floor 25 so as to prevent a pet from easily moving the base unit 20 when eating or drinking from the containers 70.

The end walls 21 also preferably each include at least one end handle 33. The end handle 33 preferably extends from the respective end wall 21. The base unit 20 also preferably includes the adjustable handle 35. The adjustable handle 35 preferably extends within the floor cavity 27 when not in use and extends outwardly from the end wall 21 when being utilized. A grasping portion of the adjustable handle 35 is also preferably positioned within an indentation 36 extending within the end wall 21 when the adjustable handle 35 is not in use. The adjustable handle 35 preferably slidably adjusts with respect to the base unit 20 and may also be comprised of a telescopic configuration.

A pair of pouches 38 also preferably extend from the rear sidewall 24 of the base unit 20. The pouches 38 may be utilized for various applications, such as but not limited to retaining various pet supplies, such as but not limited to pet leashes, pet brushes and pet treats. The pouches 38 are preferably comprised of a flexible, thin plastic, cloth or mesh like material. The pouches 38 also preferably includes a closure mechanism 39 to open and close the pouches 38 and thus secure the pet supplies within the pouches 38. The closure mechanism 39 may be comprised of various configurations, such as but not limited to an elastic band, a zipper, a hook and loop structure or various others. The opposing sidewall 24 of the base unit 20 than the sidewall 24 including the pouches 38 is preferably left blank to allow a pet to walk up to the base unit 20 and not catch upon any objects extending from the base unit 20.

C. Cover Unit

A cover unit 40 is preferably removably attached to the base unit 20 or allowed to open and close about the base unit 20. The cover unit 40 covers the opening 28 leading to the compartment 29 to prevent the pets from accessing the compartment 29 and pet food 12 within. The cover unit 40 may also be comprised of various materials, such as but not limited to plastic, to withstand various harsh weather elements and also to be easily cleaned and maintained. The cover unit 40 is preferably comprised of a rectangular shaped configuration; however it is appreciated that the cover unit 40 may be comprised of various shapes rather than the preferred embodiment. Various edges of the cover unit 40 and the base unit 20 are also preferably rounded so as to prevent the pets from being cut by the edges or the edges catching on various objects when transporting the present invention.

A ceiling panel 41 is also preferably positioned within the cover unit 40, wherein the ceiling panel 41 is parallel with the cover unit 40 and floor 25. The ceiling panel 41 defines a ceiling cavity 42 with the cover unit 40. The ceiling cavity 42 is preferably comprised of a width great enough to receive and substantially encompass the containers 70, wherein the containers 70 extend within the ceiling cavity 42. The ceiling panel 41, the end panels 22, the floor panel 26 and the sidewalls 24 preferably define the compartment 29 of the cover unit 40 and base unit 20 put together. The ceiling panel 41 also prevents any spilled pet food 12 or water from entering within the compartment 29 through the ceiling cavity 42. Any cracks or seams between adjacent ceiling panel 41 of the cover unit 40 and the opening 28 of the compartment 29 are preferably sealed in a watertight manner to prevent pet food 12 from escaping the compartment 29 and prevent dust or debris from entering within the compartment 29.

A pair of upper openings 44 also preferably extend within the upper end of the cover unit 40 and intersect with the ceiling cavity 42. The upper openings 44 each receive a respective container 70 and preferably secure the respective container 70 within. Each of the upper openings 44 preferably includes a channel 45 extending around an upper perimeter of the upper openings 44 and a plurality of slots 46 extending upwardly from each channel 45. The slots 46 are spaced apart along a perimeter of the channel 45 to form a twist lock configuration between the openings 28 of the cover unit 40 and the containers 70.

The cover unit 40 also preferably includes at least one upper handle 48. The upper handle 48 is preferably positioned within a recessed portion 49 of the cover unit 40 and further preferably centrally positioned with respect to the upper end of the cover unit 40. The upper surface of the upper handle 48 and the upper surface of the cover unit 40 are further preferably flush so as to allow stacking of various objects upon the upper surface of the cover unit 40 without engaging the upper handle 48.

D. Hinges

The present invention also preferably includes a pair of hinges 50 to movably attach the cover unit 40 to the base unit 20. The hinges 50 preferably extend within each of the end wall cavities 23 so as to not interfere or engage the pet food 12 within the compartment 29. The hinges 50 also preferably extend upwards, wherein the cover unit 40 extends in an upward manner from the base unit 20 when opening 28 the cover unit 40 from the base unit 20 to gain access to the compartment 29.

It is appreciated that various types of hinges 50 may be utilized to movably connect the cover unit 40 to the base unit 20. The cover preferably remains parallel to floor 25 of the base unit 20 while opening 28 and closing the cover unit 40 about the base unit 20 and compartment 29 via the hinges 50 to prevent any pet food 12 or water within the containers 70 from spilling while opening 28 or closing the cover about the base unit 20.

The hinges 50 preferably each include a first member 51 and a second member 52. The first member 51 is preferably pivotally attached to the base unit 20 within the respective end wall cavity 23. The second member 52 is preferably pivotally attached to the first member 51 and the cover unit 40. The second member 52 is also preferably positioned upon an inside of the first member 51. The first member 51 and the second member 52 are preferably comprised of elongated structures. The first member 51 and the second member 52 are further preferably comprised of a rigid and strong structure so as to provide adequate support for the cover unit 40 about the base unit 20.

E. Locking Mechanism

The present invention also preferably includes at least one locking mechanism 60 and preferably includes a pair of locking mechanisms 60 to secure the cover unit 40 to the base unit 20 in a closed position. The locking mechanisms 60 preferably extend between a respective end wall 21 and the cover unit 40. The locking mechanisms 60 may be comprised of various configurations all which lock the cover unit 40 closed upon the base unit 20 to prevent pets from opening 28 the cover unit 40 and accessing the pet food 12 within the compartment 29.

In the preferred embodiment, the locking mechanism 60 includes a latch 61 pivotally connected to the end wall 21 adjacent the cover unit 40. A loop member 62 extends from the latch 61. The loop member 62 may be comprised of various configurations, such as but not limited to a rounded rod or a chain. A hook portion 63 extends from the cover unit 40 directly above the latch 61.

To secure the cover unit 40 shut upon the base unit 20, the loop member 62 is extended over the hook portion 63 and the latch 61 is pivoted inwards to a parallel position with the end wall 21. To open the cover unit 40 about the base unit 20 and thus release the locking mechanism 60, the latch 61 is pivoted outwards away from the end wall 21 to a point where the loop member 62 may be removed from the hook portion 63 thus releasing the cover unit 40 from the base unit 20.

F. Containers

A pair of containers 70 are also positioned within the upper openings 44. The containers 70 may be comprised of various sizes all which adequately match up with the diameter of the openings 28. The containers 70 are utilized to hold various types of pet food 12 or liquids 13 (e.g. drinking water). The containers 70 preferably include an upper lip 71 extending around an upper perimeter of the containers 70 and a plurality of securing portions 72 extending from the upper lip 71.

The securing portions 72 are spaced apart along a perimeter of the upper lip 71 to form a twist lock configuration between the openings 28 of the cover unit 40 and the containers 70. The securing portions 72 enter the channel 45 through the slots 46 and are rotated in a clockwise manner in the channel and past the slots 46 so that the securing portions no longer are aligned with the slots 46. The upper lip 71 of the containers 70 is also preferably flush with upper surface of the cover unit 40.

The containers 70 are separate from the compartment 29 so as to prevent access to the compartment 29 from the containers 70 or vice versa. The containers 70 are able to be accessed when the cover unit 40 is in either the closed position or the open position.

G. Operation of Preferred Embodiment

In use, locking mechanism 60 is adjusted towards an open position and the cover unit 40 may be extended from the base unit 20 thus allowing access to the compartment 29. A desired amount of pet food 12 may now be dumped within the compartment 29 to store the pet food 12 for later use. The container(s) 70 may also be filled with the pet food 12 from the compartment 29 at this time. The cover unit 40 is now hingedbly closed and secured to the base unit 20 via the locking mechanisms 60.

The container(s) 70 are also replaced back within the upper openings 44 and secured within the upper openings 44 via positioning the securing portions 72 of the containers 70 within the slots 46 of the channels 45 and then rotating the containers 70 in a clockwise manner so that the securing portions 72 of the containers 70 are not aligned with the slots 46 of the channels 45. The pets may now eat or drink from the containers 70 in a normal manner. The present invention may also be transported by carrying the present invention via one of the many handles 33, 35, 48 or pulling or pushing the present invention upon the rollers 30.

What has been described and illustrated herein is a preferred embodiment of the invention along with some of its variations. The terms, descriptions and figures used herein are set forth by way of illustration only and are not meant as limitations. Those skilled in the art will recognize that many variations are possible within the spirit and scope of the invention, which is intended to be defined by the following claims (and their equivalents) in which all terms are meant in their broadest reasonable sense unless otherwise indicated. Any headings utilized within the description are for convenience only and have no legal or limiting effect.

I claim:

1. A pet feeding and storage compartment, comprising:
    a bottom base unit, a top surface cover unit, and an inside storage compartment wherein the inside storage compartment is formed within the bottom base unit and wherein the top surface cover unit is movable attached to said bottom base unit or allowed to open and dose about the bottom base unit and wherein the top surface cover unit is sealed in dosed position of said bottom base unit
    the bottom base unit includes a pair of end walls, a pair of sidewalls and a floor, an opening extends within an upper end of the bottom base unit between the pair of end walls, the pair of sidewalls and a floor wherein the opening interconnects with the inside storage compartment;
    a pair of end panels are positioned within the base unit wherein the end panels are parallel with the end walls and positioned dose to an end wall, each of the end panels and the end wall defines an end cavity, the end cavity is comprised of a width great enough to receive and encompass a hinge;
    the bottom base unit includes a plurality of rollers rotatable attached to said bottom base unit the rollers are positioned upon the four lower corners of the bottom base unit, the rollers are each positioned within a notched portion extending within the intersection of the sidewall, the end wall and the floor, the rollers extend within the notched portion a sufficient distance so the outer surface of the rollers is flush with the sidewall and the end wall, the lower surface of the rollers also does not extend a sufficient distance past the lower surface of the floor;
    the top surface cover unit covers the opening leading to the inside storage compartment wherein the top surface cover unit includes a ceiling panel positioned within the top surface cover unit wherein the ceiling panel is parallel with the top surface cover unit and floor, the ceiling panel defines a ceiling cavity with the top surface cover unit, the ceiling cavity is comprised of a width great enough to receive and encompass the bowl containers wherein the bowl containers extend within the ceiling cavity, the ceiling panel, the end panels, the floor panel and the sidewalls define the inside storage compartment of the top surface cover unit and bottom base unit put together;
    a pair of upper openings extends within the end of the interface of said top surface cover unit and intersect with the ceiling cavity, the upper openings each receives a bowl container and secures the bowl containers within, each of the upper openings includes a channel extending around an upper perimeter of the upper opening and a plurality of slots extending upwardly from each channel, the slots are spaced apart along a perimeter of the channel to form a twist lock configuration between the openings on the interface of said top surface cover unit and the bowl containers;
    the bowl containers match up with the diameter of the openings, the bowl containers includes an upper lip extending around an upper perimeter of the bowl containers and a plurality of securing portions extending from the upper lip, the securing portions are spaced apart along a perimeter of the upper lip to form the twist lock configuration between the openings on the interface of said top surface cover unit and the bowl containers, the securing portions enter the channel through the slots and are rotated in a clockwise manner in the channel and past the slots so that the securing portions no longer are aligned with the slots, the upper lip of the containers is also flush with the interface of said top surface cover unit;
    the bowl containers are also replaced back within the upper opening and secured within the upper openings via positioning the securing portions of the bowl containers within the slots of the channel and then rotating the bowl containers in a clockwise manner so that the securing portions of the bowl containers are not aligned with the slots of the channel, rotating the bowl containers in a counter clockwise manner releases the bowl containers allowing the user to clean the bowl containers;
    a pair of connecting hinges movable attach the top surface cover unit to the bottom base unit, the hinges extend within each of the end wall cavities so as not to interfere or engage the pet food within the inside storage compartment, the hinges also extend upwards wherein the top surface cover unit extends in an upward manner from the bottom base unit when opening the top surface cover unit from the bottom base unit to gain access to the inside storage compartment wherein the hinges would fold down into the end wall cavity when the top surface cover unit is in closed position, the top surface cover unit remains parallel to the floor of said bottom base unit while opening and closing the top surface cover unit about the bottom base unit and inside storage compartment via the hinges;

the connecting hinges include a first member and a second member, the first member is pivotally attached to the bottom base unit within the end wall cavity, the second member is pivotally attached to the first member and the top surface cover unit, the second member is also positioned upon an inside of the first member, the first member and the second member are comprised of elongated structures, the first member and the second member are comprised of rigid and strong structure to provide adequate support for the top surface cover unit about the bottom base unit;

a floor panel is positioned within the bottom base unit wherein the floor panel is parallel with the floor and positioned close to the floor, the floor and the floor panel define a floor cavity, the floor cavity is comprised of a width great enough to receive and encompass the adjustable handle wherein the handle extends within and out of the floor cavity, the floor panel, the end panels and the sidewalls define the inside storage compartment of said bottom base unit;

the bottom base unit includes the adjustable handle, the adjustable handle extends within the floor cavity when not in use and extends outwardly from the end wall when being utilized, a grasping portion of the adjustable handle is also positioned within an indentation extending within the end wall when the adjustable handle is not in use, the adjustable handle slid ably adjusts with respect to the bottom base unit and is comprised of a telescopic configuration;

the bottom base unit includes at least one locking mechanism and includes a pair of locking mechanisms to secure the top surface cover unit to the bottom base unit in a closed position, the locking mechanism extend between a end wall and the top surface cover unit, the locking mechanism includes a latch pivotally connected to the end wall adjacent the top surface cover unit, a loop member extends from the latch, a hook portion extends from the top surface cover unit directly above the latch, to secure the top surface cover unit shut upon the bottom base unit, the loop member is extended over the hook portion and the latch is pivoted inwards to a parallel position with the end wall, to opening the top surface cover unit about the bottom base unit and thus release the locking mechanism, the latch is pivoted outwards away from the end wall to a point where the loop member may be removed from the hook portion thus releasing the top surface cover unit from the bottom base unit;

the bottom base unit also includes at least one end handle on the end wall of said bottom base unit, the end handle extends from the end wall, the end handle is positioned below the locking mechanism of said bottom base unit;

the top surface cover unit interface includes at least one upper handle, the upper handle is positioned within a recessed portion of the top surface cover unit and is centrally position with respect to the upper end of said top surface cover unit, the upper surface of the upper handle, and the interface of said top surface cover unit, are flush so as to allow the user to stack objects upon the interface of said top surface cover unit without engaging the upper handle;

a double pouch attached and is extending from the rear sidewall of said bottom base unit, the double pouch includes a closure mechanism to open and dose the double pouch thus securing the items within said double pouch.

2. The pet feeding system and storage compartment of claim 1, the dosed bottom base unit and the closed and sealed top surface cover unit can now hold various amounts of pet food within the inside storage compartment of said bottom base unit.

3. The pet feeding system and storage compartment of claim 1, wherein any cracks or seams between the adjacent floor panel, end panel, or sidewalls are sealed in a watertight manner so as to prevent any pet food, dust, or debris from entering or escaping within the inside storage compartment of said bottom base unit.

4. The pet feeding system and storage compartment of claim 1, wherein the ceiling panel also prevents any spilled pet food, water, dust or debris from entering or escaping within the inside storage compartment through the ceiling cavity, any cracks or seams between adjacent ceiling panel of said top surface cover unit and the opening of the inside storage compartment are sealed in a watertight manner.

5. The pet feeding system and storage compartment of claim 1, wherein the rollers allow the user to easily move the pet feeding system and storage compartment and wherein the lower surface of the rollers also does not extend a sufficient distance past the lower surface of the floor so as to prevent a pet from easily moving the pet feeding system and storage compartment when eating or drinking from the bowl containers.

6. The pet feeding system and storage compartment of claim 1, wherein the bowl containers are separate from the inside storage compartment so as to prevent access to the inside storage compartment from the bowl containers or vice versa, the bowl containers are able to be accessed when the top surface cover unit is in either the open position or the closed position and wherein the bowl containers may be filled with pet food from within the inside storage compartment when said top surface cover unit is in open position and wherein at that time the user may now dump a desired amount of pet food into the inside storage compartment.

7. The pet feeding system and storage compartment of claim 1, includes a recessed handle wherein the user may open the top surface cover unit with one hand allowing the user to gain access to the inside storage compartment.

8. The pet feeding system and storage compartment of claim 1, includes at least one end handle wherein the end handles extends from the end wall of said bottom base unit allowing user to pick up the pet feeding system and storage compartment with both hands.

9. The pet feeding system and storage compartment claim 1, wherein the adjustable handle slid ably adjusts with respect to the bottom base unit and comprising of a telescopic configuration allows the user to transport by hand the pet feeding system and storage compartment by pulling or pushing upon the rollers.

* * * * *